US009025196B2

(12) United States Patent
Moriya et al.

(10) Patent No.: US 9,025,196 B2
(45) Date of Patent: May 5, 2015

(54) PRINTING SYSTEM AND PRINTING METHOD

(71) Applicant: Seiko Epson Corporation, Tokyo (JP)

(72) Inventors: Yuki Moriya, Shiojiri (JP); Kenji Yanagishita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

(21) Appl. No.: 13/660,358

(22) Filed: Oct. 25, 2012

(65) Prior Publication Data

US 2013/0107287 A1 May 2, 2013

(30) Foreign Application Priority Data

Oct. 28, 2011 (JP) ................................ 2011-236939

(51) Int. Cl.

| | |
|---|---|
| ***G06K 15/02*** | (2006.01) |
| ***B41M 1/12*** | (2006.01) |
| ***B41L 13/00*** | (2006.01) |
| ***B41J 3/54*** | (2006.01) |
| ***B41J 3/407*** | (2006.01) |
| ***B41J 11/06*** | (2006.01) |
| ***B41J 11/46*** | (2006.01) |
| *B41F 15/06* | (2006.01) |

(52) U.S. Cl.

CPC ................ *B41J 3/546* (2013.01); *B41J 3/4078* (2013.01); *B41J 11/06* (2013.01); *B41J 11/46* (2013.01)

(58) Field of Classification Search

None

See application file for complete search history.

(56) References Cited

U.S. PATENT DOCUMENTS

| | | | | |
|---|---|---|---|---|
| 5,241,187 | A * | 8/1993 | Ikeda et al. | 250/548 |
| 7,311,041 | B2 | 12/2007 | Niimi | |
| 2004/0187715 | A1 * | 9/2004 | Niimi | 101/114 |
| 2008/0225357 | A1 * | 9/2008 | Ohara et al. | 358/498 |

FOREIGN PATENT DOCUMENTS

| | | |
|---|---|---|
| JP | 2004-291493 | 10/2004 |
| JP | 2005-045644 | 2/2005 |

* cited by examiner

*Primary Examiner* — Marcus T Riley
*Assistant Examiner* — Pawandeep Dhingra
(74) *Attorney, Agent, or Firm* — Workman Nydegger

(57) ABSTRACT

A printing system includes a screen printing unit as a printing processor of a non-digital system and an ink jet printing device as a printing processor of a digital system. Holes as reference marks formed in a three-dimensional shape are provided on a placement table which is used commonly in the screen printing unit and the ink jet printing device. Positioning of printing positions is performed with reference to the same holes on both of the screen printing unit and the ink jet printing device.

3 Claims, 5 Drawing Sheets

PRINTING SYSTEM AND PRINTING METHOD

BACKGROUND

1. Technical Field

The present invention relates to a printing system having a printing processor of a digital system, which includes a printing head for discharging ink onto a printing target material based on digital data to execute desired printing, and a printing processor of a non-digital system.

Further, the invention relates to a printing method having a printing process of a digital system by using a printing head for discharging ink onto a printing target material based on digital data to execute desired printing, and a printing process of a non-digital system.

2. Related Art

In clothing manufactures and textile manufactures, existing "printing" in which a design and the like are printed on a surface of a fabric main body has been widely performed. There are various printing methods. There are an analog system (hereinafter, referred to as "non-digital system" in the specification) exemplified by the screen printing, for example, and a digital system by an ink jet printing device which adheres ink discharged from a printing head to a printing target material so as to execute printing.

The non-digital system is suitable for mass production and printing can be performed on a large area for a short period of time with the non-digital system. However, in the case of a screen printing system, for example, a screen dedicated to each of different designs is required to be prepared and a screen is required to be prepared newly when changing a design. Therefore, there is a disadvantage in the non-digital system that the degree of freedom is lower. On the other hand, the digital system tends to be inferior to the non-digital system in terms of mass production. However, when an ink jet printing device is used, for example, the digital system can respond to various designs extremely easily and rapidly.

Accordingly, for example, in order to use the advantages of both the non-digital system and the digital system, a printing processing method in which a background image is printed with the non-digital system, and then, a center image is printed with the digital system is also employed (for example, see, JP-A-2004-291493 and JP-A-2005-45644).

Meanwhile, when printing is performed through the two printing processes, there arises a risk that deviation of printing positions between first printing and subsequent printing occurs. In JP-A-2005-45644, in view of the above-described problem, a system in which a T-shirt or the like on which screen printing has been performed is placed on a platen, an image is read by a CCD image sensor across the whole platen, the read image and an input image (which is an image to be printed) are displayed on a screen of a monitor in a superimposed manner, positioning is performed by a user operation, and then, printing is performed has been disclosed. Further, a technique in which a digital camera is used instead of the CCD image sensor and, two identification markers given onto the platen are read by the digital camera, and image analysis is performed based on the read result has been also disclosed.

However, with the technique as described in JP-A-2005-45644, positioning is performed by the user operation on the monitor screen. Therefore, time and efforts are required for the positioning and this arises a risk that productivity is lowered as a whole.

SUMMARY

An advantage of some aspects of the invention is to provide a printing system and a printing method in which, when printing with a non-digital system and printing with a digital system are performed in combination, deviation of printing positions is reduced or prevented more efficiently.

A printing system according to a first aspect of the invention includes a printing processor of a digital system that includes a printing head for discharging ink onto a printing target material based on digital data to execute desired printing, and a printing processor of a non-digital system. In the printing system, a reference mark formed in a three-dimensional shape is provided on a placement table which is used commonly in the printing processor of the digital system and the printing processor of the non-digital system, the printing processor of the non-digital system includes a fitting portion which is fitted into the reference mark, and the fitting portion and the reference mark are fitted with each other so as to perform positioning of a printing position, and the printing processor of the digital system includes a detecting unit which detects the reference mark, and a controller which controls the printing processor of the digital system performs positioning of a printing position based on a detected result by the detecting unit.

According to the aspect of the invention, the reference mark formed in the three-dimensional shape is provided on the placement table which is used commonly in the printing processor of the digital system and the printing processor of the non-digital system. Further, positioning of the printing positions can be performed with reference to the same reference mark on both of the printing processor of the digital system and the printing processor of the non-digital system. Therefore, deviation of the printing positions when the printing with the non-digital system and the printing with the digital system are performed in combination can be reduced or prevented easily and more reliably with a simple configuration.

Further, in the printing processor of the digital system, the reference mark is detected by the detecting unit and the controller performs the positioning of the printing position based on the detected result thereof. Therefore, a positioning operation by a user is not required, thereby improving productivity.

It is to be noted that the printing processor of the non-digital system indicates a printing processor which performs print processing without depending on digital data.

According to a second aspect of the invention, it is preferable that the reference mark be formed by any one of a recess, a projection, and a hole, in the first aspect of the invention.

According to the aspect of the invention, the reference mark is formed by any one of a recess, a projection, and a hole. Therefore, the reference mark can be obtained with a simple configuration at low cost.

A printing method according to a third aspect of the invention includes a printing process of a digital system by using a printing head for discharging ink onto a printing target material based on digital data to execute desired printing, and a printing process of a non-digital system. In the printing method, a reference mark that is provided on a placement table which is used commonly in the printing process of the digital system and the printing process of the non-digital system, is capable of being detected by a detecting unit in the printing process of the digital system, and is formed in a three-dimensional shape and a fitting portion that is fitted into the reference mark are fitted with each other in the printing process of the non-digital system so as to perform positioning of a printing position in the printing process of the non-digital system.

According to the aspect of the invention, the reference mark formed in the three-dimensional shape is provided on the placement table which is used commonly in the printing process of the digital system and the printing process of the non-digital system. Further, the printing positions can be positioned with reference to the same reference mark in both of the printing process of the digital system and the printing process of the non-digital system. Therefore, deviation of the printing positions when the printing with the non-digital system and the printing with the digital system are performed in combination can be reduced or prevented easily and more reliably with a simple configuration.

It is to be noted that the printing process of the non-digital system indicates a printing process of performing print processing without depending on digital data.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention is described with reference to the drawings. However, the invention is not limited to the embodiment as will be described below and the embodiment can be variously varied in a range of the invention which is described in the scope of the invention. An embodiment of the invention is described below under the assumption that the variations are also encompassed in the range of the invention.

Figure 1A:
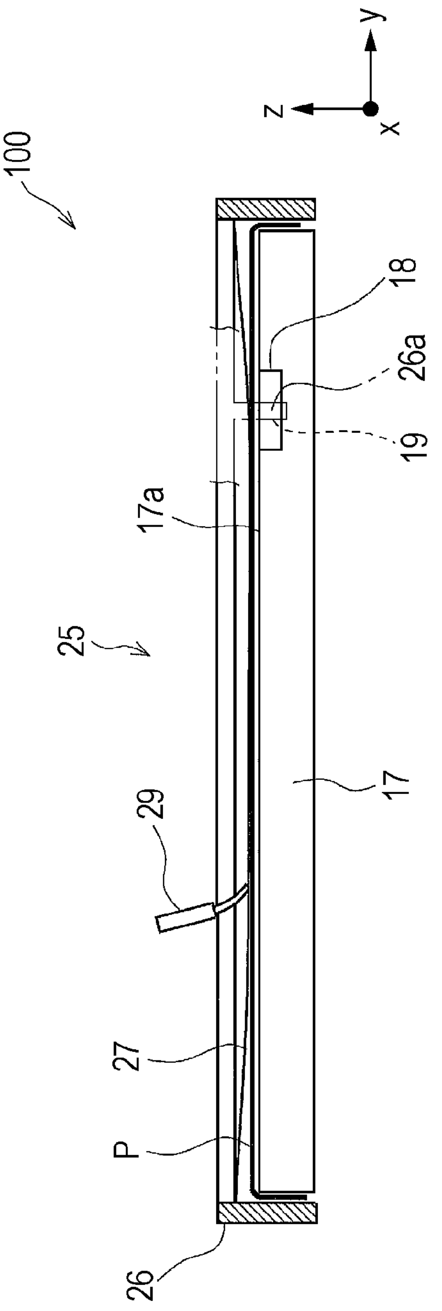
FIGS. 1A and 1B illustrate a configuration of a printing system according to the invention.
Figure 1B:
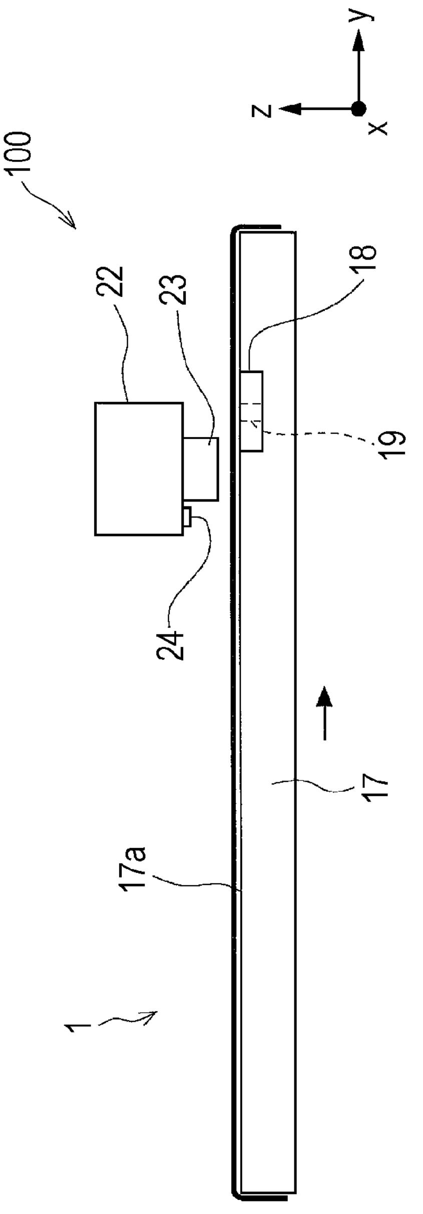
Figure 2:
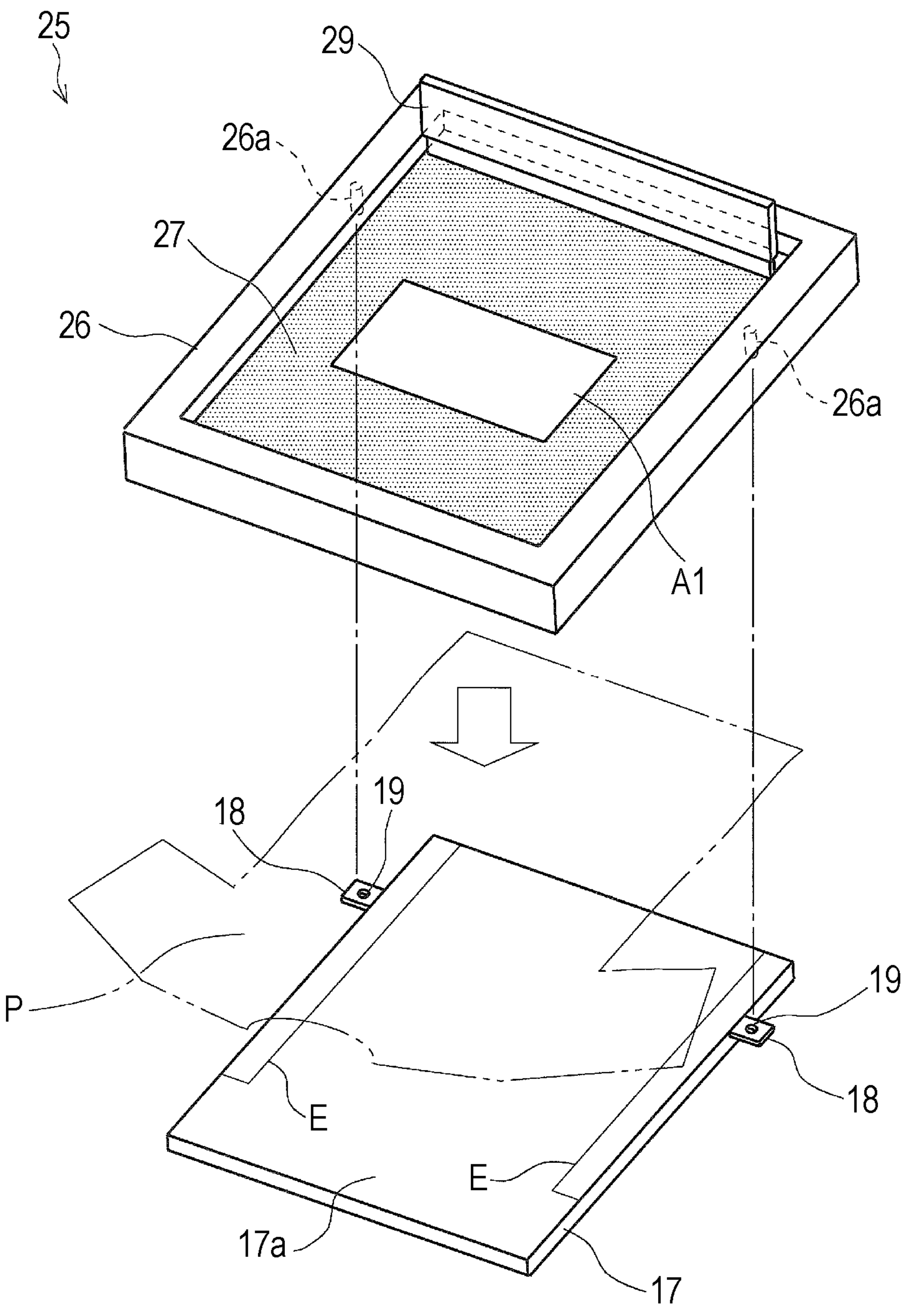
FIG. 2 is a perspective view illustrating a configuration of a screen printing unit (non-digital printing portion).
Figure 3:
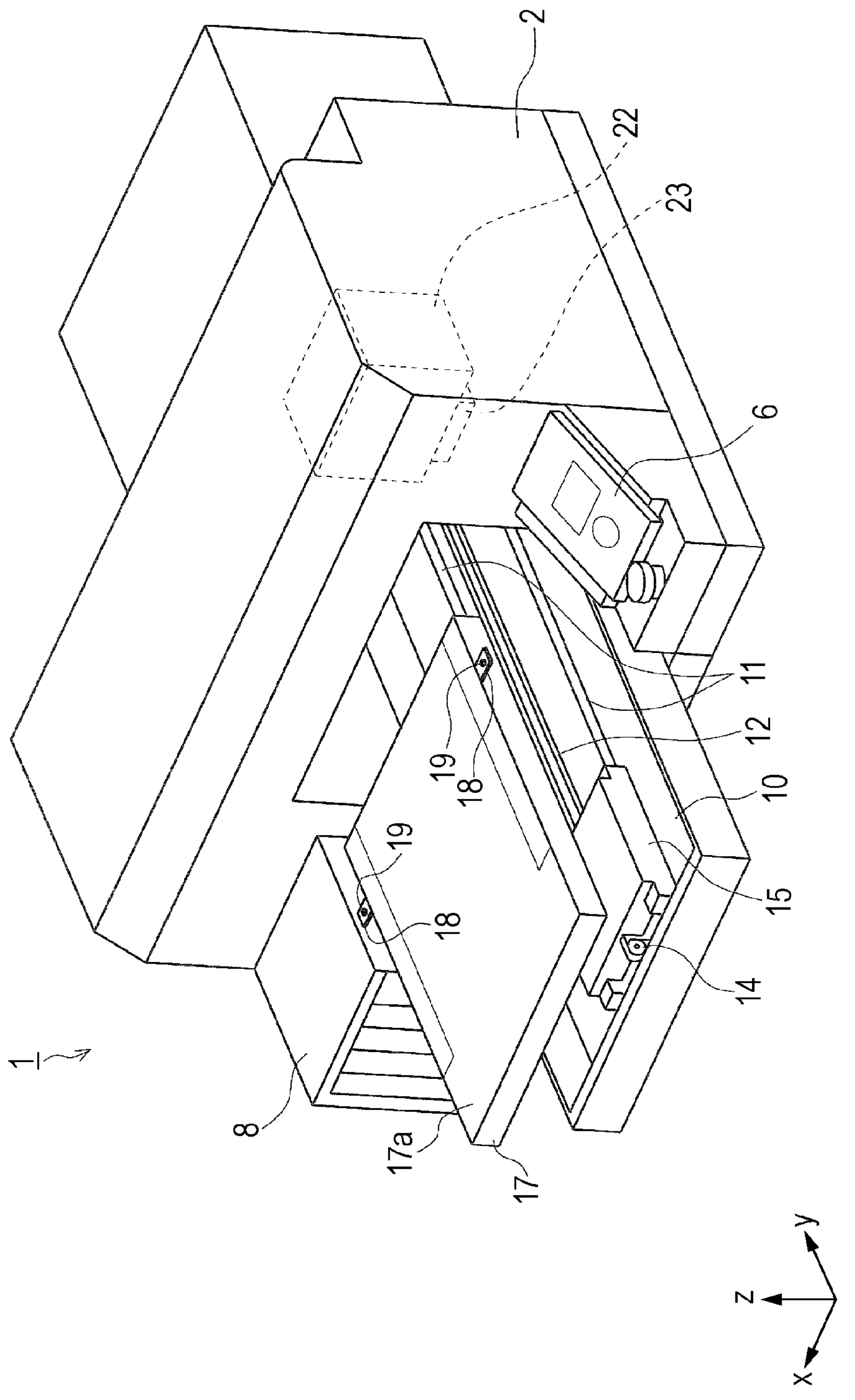
FIG. 3 is an outer appearance perspective view illustrating an ink jet printing device (digital printing portion).
Figure 4:
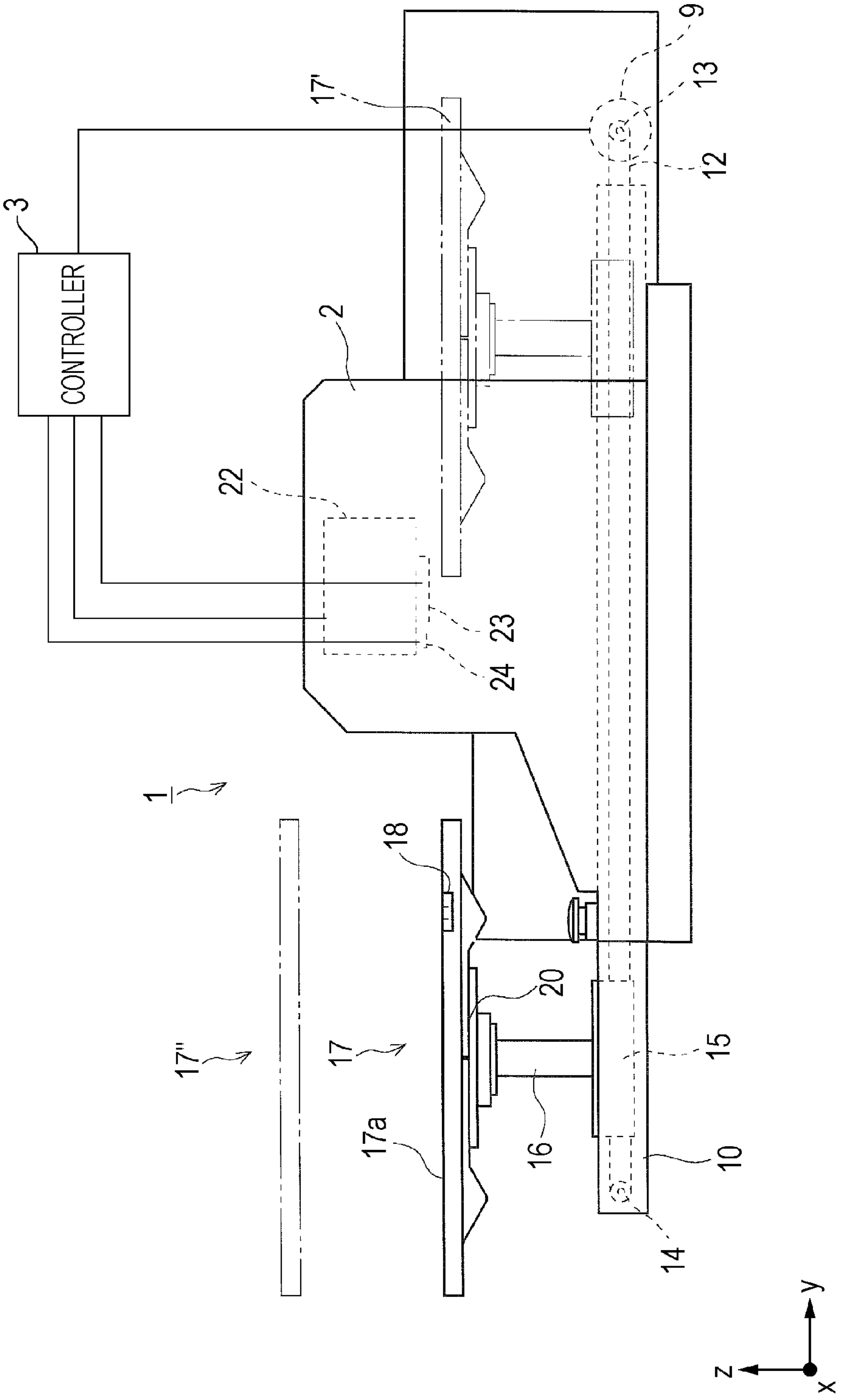
FIG. 4 is a side surface view illustrating the ink jet printing device (digital printing portion).
Figure 5:
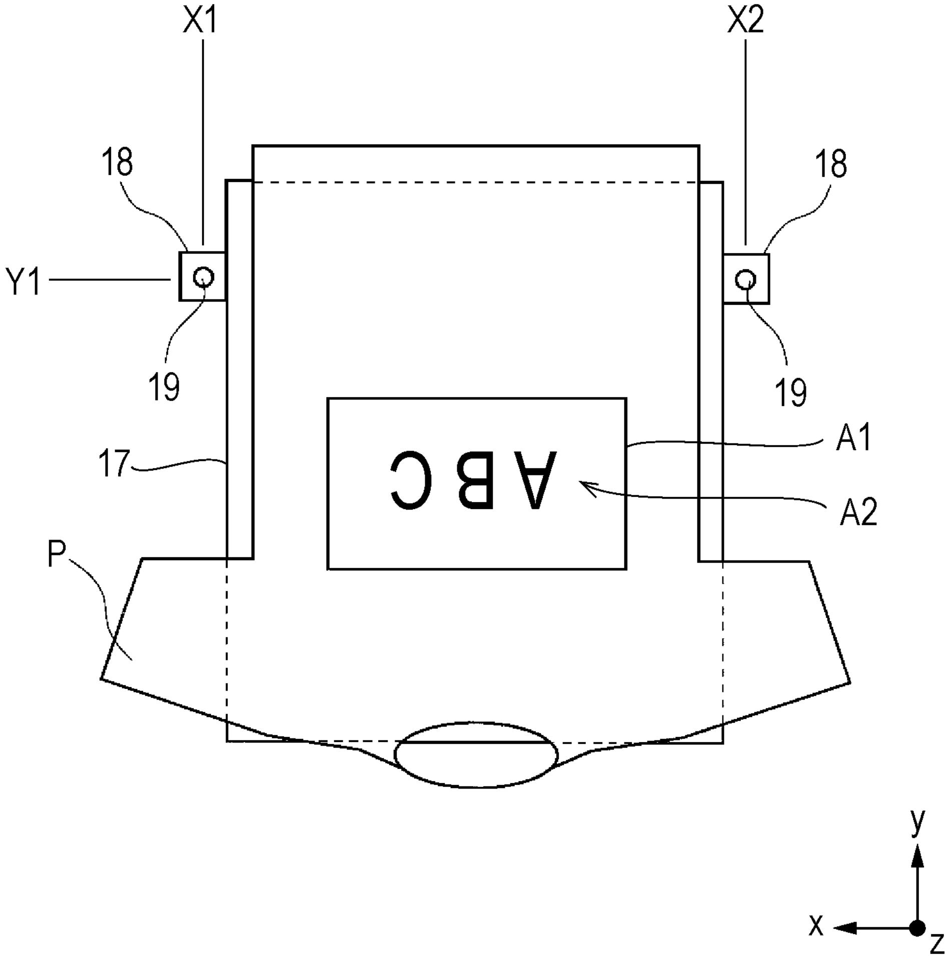
FIG. 5 is a plan view illustrating a positional relationship between reference marks and a printing region.

FIGS. 1A and 1B are views illustrating the configuration of a printing system according to the invention. FIG. 1A is a transverse cross-sectional view illustrating a screen printing unit 25 and FIG. 1B is a transverse cross-sectional view illustrating main parts of an ink jet printing device 1. FIG. 2 is a perspective view illustrating a configuration of the screen printing unit (non-digital printing portion) 25. FIG. 3 is an outer appearance view illustrating the ink jet printing device (digital printing portion) 1. FIG. 4 is a side surface view illustrating the ink jet printing device (digital printing portion) 1. FIG. 5 is a plan view illustrating a positional relationship between holes 19 as reference marks and a printing region.

It is to be noted that in the drawings, an x-y-z coordinate system indicates directions for the convenience of description. The z direction indicates the vertical (gravity force) direction, the y direction indicates the transportation direction (movement direction of a placement table) of a printing target material P on the ink jet printing device 1, and the x direction indicates the direction orthogonal to the y direction and the z direction.

In FIGS. 1A and 1B, a printing system 100 according to an embodiment of the invention includes the silk screen printing unit 25 as a non-digital printing processor and the ink jet printing device 1 as a digital printing processor. The silk screen printing unit 25 performs the printing process of the non-digital system. The ink jet printing device 1 performs the printing process of the digital system.

In the example which will be described below, printing is performed on the printing target material P by the silk screen printing unit 25 first, and then, printing is performed thereon by the ink jet printing device 1. However, the invention is not limited to this order. In addition, the non-digital printing processing is not limited to the silk screen printing.

At first, the screen printing unit 25 as the non-digital printing portion includes a placement table 17, a screen frame 26, and a squeegee 29 as illustrated in FIG. 1A and FIG. 2.

The upper surface of the placement table 17 corresponds to a placement surface 17*a* on which the printing target material P is placed. Printing is performed on the printing target material P in a state where the printing target material P is placed on the placement surface 17*a*. It is to be noted that the placement table 17 is used on the ink jet printing device 1, which will be described later, as it is. That is to say, the placement table 17 is used commonly on the screen printing unit 25 and the ink jet printing device 1.

A screen 27 is spread on the screen frame 26, and a print image A1 is formed on the screen 27. Positioning lines E are drawn on the placement table 17, and the printing target material P to be placed is positioned along the positioning lines E. It is to be noted that the printing target material P is a shirt in this example. The positioning lines E are drawn so as to match with partial contours of the body portion and the sleeve portions of the printing target material P. The printing target material P is placed on the placement table 17 such that the contours of the body portion and the sleeve portions of the printing target material P match with the positioning lines E.

Tongue pieces 18 are formed on both end portions of the placement table 17, and holes 19 as reference marks are provided on the tongue pieces 18. The tongue pieces 18 are provided at positions at which the tongue pieces 18 are not covered by the printing target material P when the printing target material P is placed on the placement table 17.

On the other hand, positioning bosses 26*a* as fitting portions are provided on the screen frame 26. When the screen frame 26 is set onto the placement table 17, the positioning bosses 26*a* are fitted into the holes 19 so that the position of the screen frame 26 on the placement table 17, that is, the position of the print image A1 is determined (see FIG. 1A, too).

Further, ink is applied onto the screen 27 in a state where the screen frame 26 is fitted into the placement table 17. Then, the squeegee 29 is moved in the direction indicated by an arrow in FIG. 1A so as to perform printing of the print image A1. In the process, in particular, the operation of the squeegee 29 may be performed by a user operation or may be performed automatically by a screen printing device. It is to be noted that as illustrated in FIG. 5 as an example, the print image A1 is a background image and a center image A2 is printed in the ink jet printing process as a subsequent process. In the example, a case in which printing is performed in this manner is described as an example.

Next, the ink jet printing device 1 is described. The ink jet printing device 1 is a digital printing unit which makes it possible to obtain a desired print result by discharging ink from an ink jet head 23 as a printing head based on digital data. As illustrated in FIG. 3 and FIG. 4, the ink jet printing device 1 includes a guide table 10 on the bottom portion of a device main body 2 and the placement table 17 is configured to move on the guide table 10. To be more specific, a guide shaft 11 parallel with the y direction is arranged on the guide table 10 and a base 15 is guided by the guide shaft 11 in the y direction.

Further, an endless belt 12 is wound around between a driving pulley 13 and a driven pulley 14 along the y direction. A lower base 15 is fixed to a part of the endless belt 12. The driving pulley 13 is driven rotationally by a tray driving motor 9. If the endless belt 12 is operated with the rotational driving, the lower base 15 is moved in the y direction.

A shaft 16 is erected on the base 15, and the placement table 17 can be attached onto the shaft 16 through an attachment-detachment portion 20 in a detachable manner (a reference numeral 17" indicates a state where the placement table 17 is detached). Then, the placement table 17 on which the printing target material P is placed is moved in the y direction so that the printing target material P can pass through under a portion of the ink jet head 23 as the printing head.

Next, an operation panel 6 for performing various types of operations is arranged on the front right surface side of the ink jet printing device 1. An ink cartridge accommodating portion 8 which accommodates an ink cartridge is provided on the device front surface at an opposite side (device left side) to the operation panel 6 with the placement table 17 therebetween.

The ink jet head 23 constituting a printing executing portion to which ink is supplied from the ink cartridge accommodated in the ink cartridge accommodating portion 8 corresponds to an ink jet head having a well-known configuration, which includes a plurality of nozzle rows (not illustrated) on which nozzle openings (not illustrated) for discharging ink are aligned. Further, the ink jet head 23 is mounted on a carriage 22 which is driven to reciprocate in the x direction (surface-rear direction of a paper plane in FIG. 2) intersecting with the transportation direction y.

In the ink jet printing device 1, the ink jet head 23 is a so-called serial type head which discharges ink while moving in the x direction intersecting with the transportation direction y. However, it is needless to say that the ink jet head 23 may be a line head, and the line head may be provided in a fixed manner or may be provided so as to move in the transportation direction y.

The placement table 17 is transported to a virtual line at a position denoted by a reference numeral 17' (printing start position). Then, movement of the placement table 17 to the device front side (left side in FIG. 4) and discharge of ink from the ink jet head 23 are performed alternately so that printing is executed. If the discharge of ink onto the printing target material P has finished, the placement table 17 returns to a position (set position of the printing target material P) indicated by the solid line in FIG. 4 and the printing target material P onto which ink has been discharged can be taken out.

An optical sensor 24 as a detecting portion is provided on the bottom surface of the carriage 22, which is opposed to the placement table 17. The optical sensor 24 includes a light emitting portion and a light receiving portion (not illustrated), and detects the holes 19 provided on the placement table 17 by change of reflected light.

A controller 3 is a control unit which controls the driving motor 9, the carriage 22 (motor (not illustrated) for driving the carriage 22), and the ink jet head 23 as described above. A detected value by the optical sensor 24 is input to the controller 3. The controller 3 has information relating to the positions of the two holes 19 on the x-y plane, and senses and detects the two holes 19 based on the positional information. Further, an error between the actual positions of the holes 19 based on the sensed result and the theoretical positions of the holes 19 that are possessed as the positional information is calculated.

To be more specific, as illustrated in FIG. 5, the positions (X1, X2) of the two holes 19 in the x direction and the position (Y1) thereof in the y direction are obtained through the sensing by the optical sensor 24. The center image A2 is printed based on the obtained positions. It is to be noted that items to be corrected based on the sensing result of the holes 19 correspond to a position of the print image A2, an inclination of the print image A2, or both of the position and the inclination thereof.

As described above, with the printing system 100 according to the invention, the holes 19 and 19 as the reference marks formed in the three-dimensional shapes are provided on the placement table 17 which is used commonly on the screen printing unit 25 as the printing processor of the non-digital system and the ink jet printing device 1 as the printing processor of the digital system. Accordingly, positioning of the printing positions can be performed with reference to the same holes 19 and 19 in both of the screen printing unit 25 and the ink jet printing device 1. Therefore, deviation of the printing positions when the printing with the non-digital system and the printing with the digital system are performed in combination can be reduced or prevented easily and more reliably with a simple configuration.

Further, in the ink jet printing device 1 as the printing processor of the digital system, the holes 19 and 19 as the reference marks are detected by the optical sensor 24 as the detecting unit and the controller 3 performs positioning of the printing positions based on the detected result. Therefore, a positioning operation by a user is not required, thereby improving the productivity.

Further, the reference marks are formed by the holes as one example of the three-dimensional shapes. Therefore, the reference marks can be obtained with a simple configuration at low cost. It is to be noted that the reference marks may be formed by recesses or projections.

It is needless to say that the embodiment as described above is an example and the invention is not limited to the embodiment. Further, the invention is applied to the ink jet printing device which discharges ink onto the printing target material such as a fabric. However, the invention can be also applied to an ink jet recording device which performs recording on a recording target medium such as recording paper.

The entire disclosure of Japanese Patent Application No. 2011-236939, filed Oct. 28, 2011 is expressly incorporated by reference herein.

What is claimed is:

1. A printing system comprising:

a printing device of a digital system that includes a printing head for discharging ink onto a printing target material based on digital data, and a printing unit of a non-digital system, the non-digital system configured to form a print image on the printing target material, and a placement table that includes a reference mark formed in a three-dimensional shape, wherein the placement table is used commonly by the printing device of the digital system during discharging ink onto the printing target material and forming the print image by the printing unit of the non-digital system, the printing unit of the non-digital system includes a fitting portion which is fitted into the reference mark, and the fitting portion and the reference mark are fitted with each other so as to perform positioning of a printing position for forming the print image with the printing unit of the non-digital system when the printing target material is mounted on the placement table, and the printing device of the digital system includes a detecting unit which detects the reference mark, and a controller which controls the printing device of the digital system to perform positioning of a printing position based on a detected result by the detecting unit when the printing target material is mounted on the same placement table.

2. The printing system according to claim 1, wherein the reference mark is formed by any one of a recess, a projection, and a hole.

3. A printing method comprising:

printing process with a digital system by using a printing head for discharging ink onto a printing target material based on digital data printing process with a non-digital system to form a print image, wherein a three-dimensional shaped reference mark is provided on a placement table which is used commonly in the printing process by the digital system and the printing process by the non-digital system, the reference mark is capable of being detected by a detecting unit in the printing process by the digital system when the printing target material is mounted on the placement table, and a fitting portion that is fitted into the reference mark are fitted with each other in the printing process by the non-digital system so as to perform positioning of a printing position in the printing process by the non-digital system when the printing target material is mounted on the same placement table.

* * * * *